(12) United States Patent
Wollert

(10) Patent No.: US 8,646,622 B2
(45) Date of Patent: Feb. 11, 2014

(54) ADJUSTABLE TOOL SUPPORT CLAMP

(75) Inventor: Gary S. Wollert, Bristol, WI (US)

(73) Assignee: Snap-on Incorporated, Kenosha, WI (US)

( * ) Notice: Subject to any disclaimer, the term of this patent is extended or adjusted under 35 U.S.C. 154(b) by 125 days.

(21) Appl. No.: 13/364,808

(22) Filed: Feb. 2, 2012

(65) Prior Publication Data

US 2013/0200020 A1    Aug. 8, 2013

(51) Int. Cl.
| B25H 3/04 | (2006.01) |
| A47H 1/022 | (2006.01) |
| A47H 1/08 | (2006.01) |
| A47F 7/00 | (2006.01) |
| A47H 13/00 | (2006.01) |

(52) U.S. Cl.
USPC ............. 211/70.6; 211/124; 211/105.6

(58) Field of Classification Search
USPC ............. 211/70.6, 105.1–105.6, 123, 124, 211/89.01, 175, 87.01; 224/281, 400, 402, 224/403, 523, 538, 545, 550, 551, 558, 562, 224/567, 570; 248/206.5, 200.1, 251; 108/44, 137, 143; 16/87.4 R
See application file for complete search history.

(56) References Cited

U.S. PATENT DOCUMENTS

| 711,621 | A |   | 10/1902 | Fergusson |            |
|---------|---|---|---------|-----------|------------|
| 2,369,123 | A | * | 2/1945 | Abshire   | 250/455.11 |
| 2,465,414 | A | * | 3/1949 | Abshire   | 313/51     |
| 2,675,983 | A |   | 4/1954 | King      |            |
| 4,197,573 | A | * | 4/1980 | Thatch    | 362/241    |
| 5,149,166 | A |   | 9/1992 | Wille et al. | |
| 5,436,815 | A |   | 7/1995 | Grooms et al. | |
| 5,673,988 | A |   | 10/1997 | Fujita | |
| 6,585,400 | B2 |  | 7/2003 | Leen | |
| 6,626,402 | B1 |  | 9/2003 | Kaminstein | |
| 6,669,353 | B2 |  | 12/2003 | Kung | |
| 6,799,863 | B2 | * | 10/2004 | Offiler et al. | 362/220 |
| D544,977 | S |   | 6/2007 | Qi | |
| 7,258,459 | B2 | * | 8/2007 | Wang | 362/101 |
| 7,401,940 | B2 |  | 7/2008 | Min | |
| 7,517,109 | B2 |  | 4/2009 | Kim et al. | |
| 7,549,778 | B2 |  | 6/2009 | Chien | |
| 2008/0186699 | A1 | | 8/2008 | Saez et al. | |
| 2008/0304257 | A1 | | 12/2008 | Opolka | |
| 2011/0042530 | A1 | | 2/2011 | Phillips et al. | |

FOREIGN PATENT DOCUMENTS

WO    WO 00/57103    9/2000

OTHER PUBLICATIONS

PCT International Search Report, dated Mar. 19, 2013; 2 pgs.
PCT Written Opinion of the International Searching Authority, dated Mar. 1, 2013; 10 pgs.

* cited by examiner

*Primary Examiner* — Jennifer E Novosad
(74) *Attorney, Agent, or Firm* — Seyfarth Shaw LLP

(57) ABSTRACT

A clamp structure that provides versatility and structural adaptability to different clamping surfaces. A tension member can be coupled to the inside of a tubular body at one end and to a rod at the other end. Removable grips can be coupled to the ends of the body, but are not directly coupled to the tension member so that changing the grips can be done without removing the tension member from its anchored position. The grips can, in some embodiments, be pivotable so as to accommodate a variety of different gripping surfaces. Various holding members such as a tool holder, a utility hook and/or a claw grip can be movably provided on the body and can hold tools or light fixtures in a variety of configurations.

20 Claims, 5 Drawing Sheets

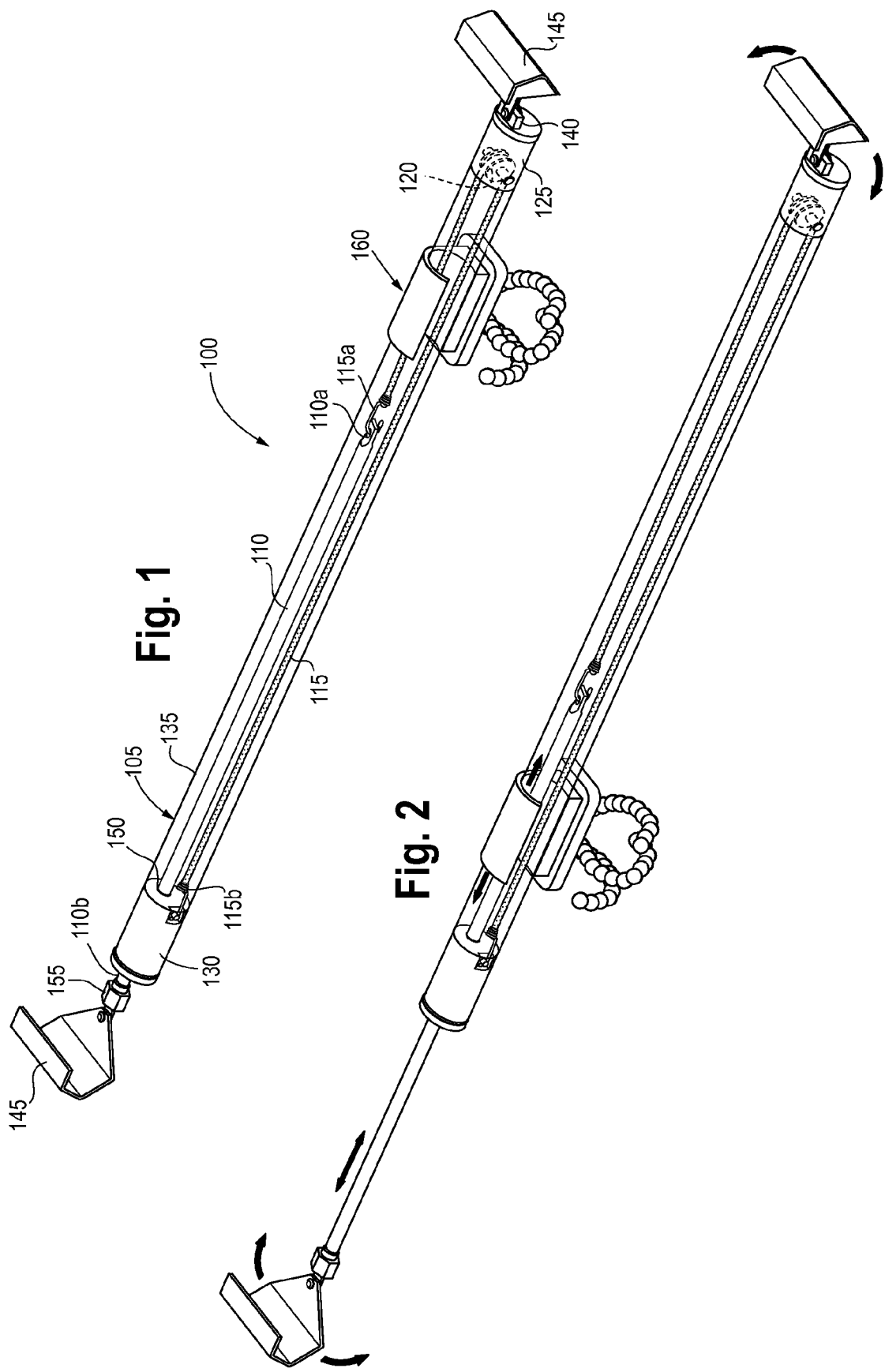

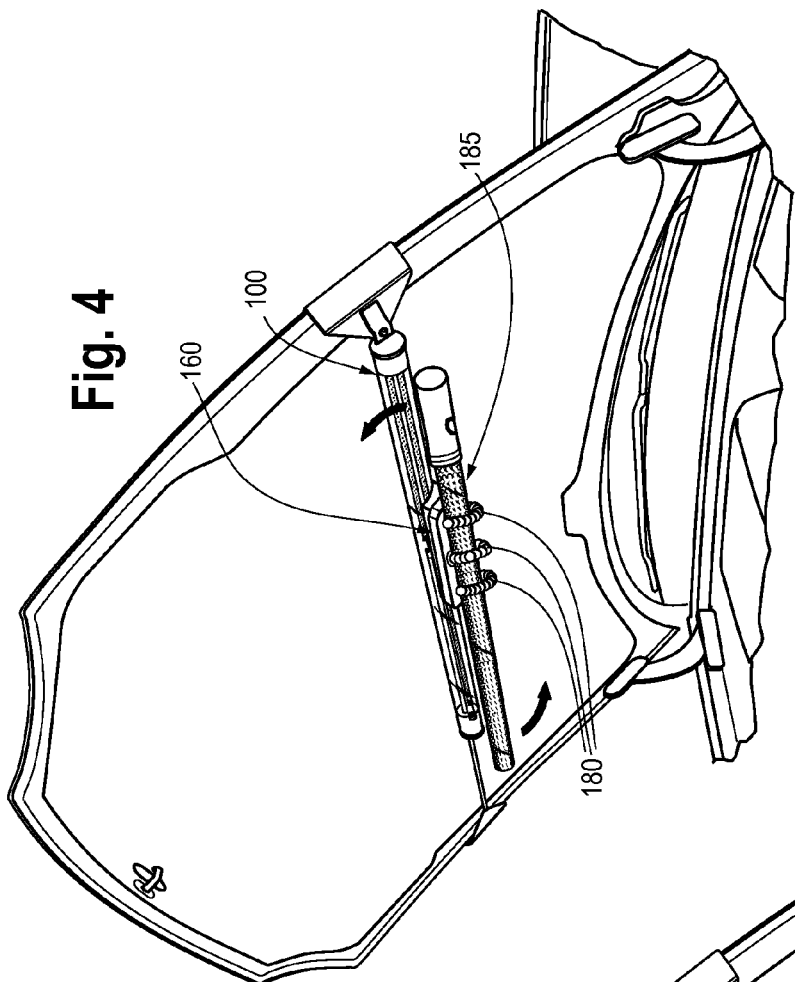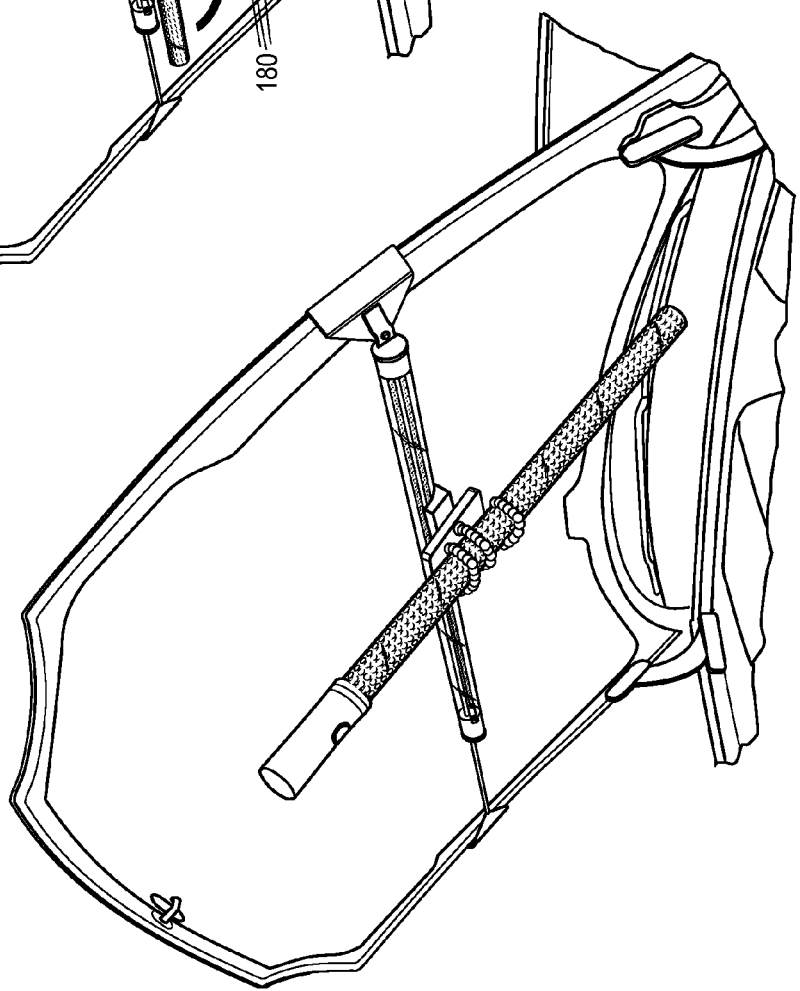

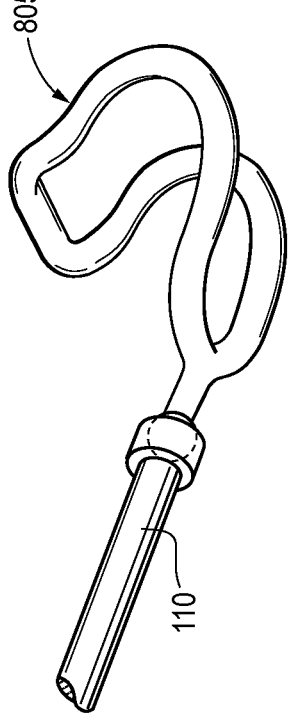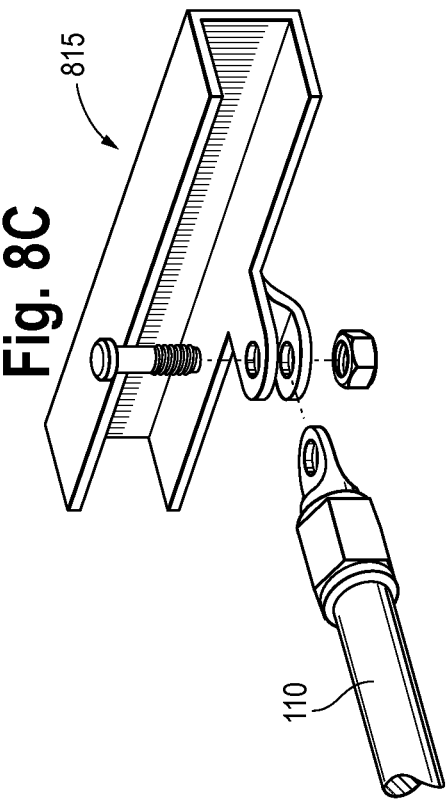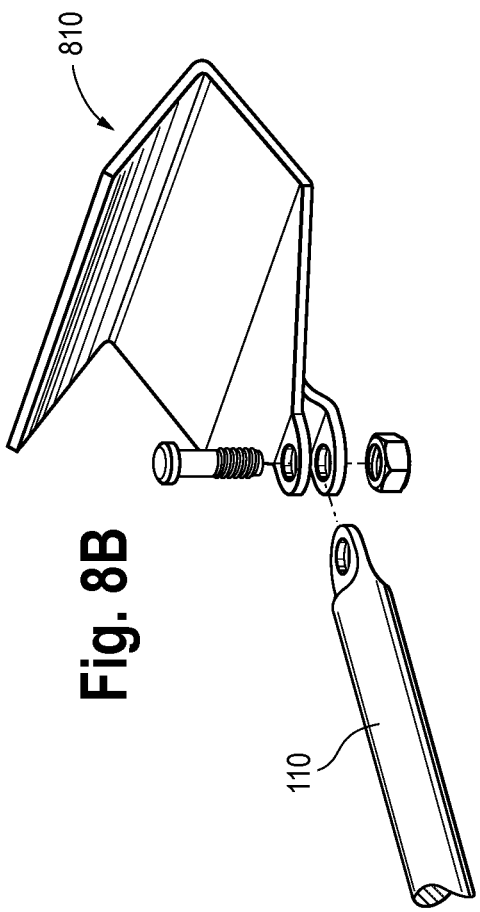

ADJUSTABLE TOOL SUPPORT CLAMP

FIELD OF THE INVENTION

The present application relates generally to clamps. More particularly, the present application relates to an adjustable tool support clamp having a removable gripping mechanism and tension member configuration.

BACKGROUND OF THE INVENTION

Adjustable support clamps are commonly used in the automotive industry to hold objects under the hood of the automobile when performing repairs or other tasks. Conventional support clamps typically include hooks that engage lateral edges of an automobile hood and position a light to illuminate the working space. Typically, soft rubber, plastic or non-marring pads are disposed over the hooks of the support clamps to protect the vehicle paint or metal from being damaged. However, the soft pads of the gripping hooks tend to wear after use, exposing the metal hooks underneath. The metal hooks can then scratch or otherwise damage the vehicle body without the protection of the soft pads.

The gripping hooks are typically under tension, making them difficult to replace. That is, one type of conventional gripping hook is attached directly to a bungee cord or other tension member concealed within a tube. If a user were to try to replace the gripping hook, the user would need to remove the gripping hook from the tension member, and hold the tension member in place against the elastic bias of the member. If the user were to accidentally release the tension member, it would retract inside the tube and be difficult to retrieve.

Conventional clamps are somewhat generic in design to fit over the largest hood flange, but in turn, are unstable when gripping narrower flanges. Also, some conventional hood flanges include lateral side edges that are parallel, and others include lateral side flanges that are tapered. The generic design of the conventional clamp causes the clamp to have difficulty gripping the many different flange designs and, in some cases, the clamp can slip and cause damage when attached to a tapered flange. Also, conventional gripping hooks are rigid or rotatable in only one direction, making it difficult to adequately grip many surfaces unless the gripping hooks are perfectly aligned.

Conventional clamps also lack versatility in that they are designed to hold only one specific type of device in place, typically a long tubular light similar to a fluorescent light bulb. The long tube light is usually disposed along a longitudinal axis between the gripping hooks and distributes light primarily in a direction between the gripping hooks. However, many common automotive tasks require light to be transmitted to other areas, such as work performed on timing belts and water pumps. The conventional support clamp is generally not well suited to provide concentrated light to these specific areas.

For example, in many prior art clamps, tubular members such as the body are comprised of two overlapping cylinders that slide relative to one another and are biased to a closed position. Other prior art clamps include tension members that attach directly to the grips and require the user to hold the tension member in place while removing the grip.

SUMMARY OF THE INVENTION

The clamp disclosed in the present application provides additional advantages to conventional support clamps by adding versatility and structural adaptability to the support clamp. The present application discloses an adjustable tool support clamp having a tension member enclosed by a tubular body. The tension member is coupled to the inside of the tubular body at a first end, and to a rod at an opposing second end. Removable grips may be coupled to the ends of the tubular body, but are preferably not directly coupled to the tension member. The grips can be pivotable to accommodate a variety of different gripping surfaces.

The present application also discloses various holding members that can be slidably disposed on the tubular body. For example, the holding members can include a tool holder, a utility hook and/or a claw grip that can be fixed or movable relative to the body. The claw grip can hold a light fixture and can rotate to direct concentrated light in specific areas where light is needed.

In an embodiment, the present application discloses a tool clamp having a body including a cavity, a tension member having first and second tension member ends, the first end coupled to the body, and a rod movably received within the body and having first and second rod ends, the first rod end adapted to receive a first grip, and the second rod end adapted to be coupled to the second tension member end and receive bias force therefrom; and a receiving member coupled to the body and adapted to receive a second grip.

A tool clamp including a body having a cavity, a tension member having first and second tension member ends and disposed in the cavity of the body and adapted to indirectly apply bias to first and second grips and compressively maintain the tool clamp on a gripping surface, and a claw grip movably provided on the body and including a plurality of claw arms adapted to collectively grip an object, wherein the claw grip is adapted to move along the body and is further adapted to rotate in a plane substantially parallel to the body.

BRIEF DESCRIPTION OF THE DRAWINGS

For the purpose of facilitating an understanding of the subject matter sought to be protected, there is illustrated in the accompanying drawings embodiments thereof, from an inspection of which, when considered in connection with the following description, the subject matter sought to be protected, its construction and operation, and many of its advantages should be readily understood and appreciated.

FIG. 1 is a perspective view of an embodiment of an adjustable tool support clamp, with the clamp disposed in an at-rest position.

FIG. 2 is a perspective view of the adjustable tool support clamp of FIG. 1, with the clamp disposed in an in-use position.

FIG. 4 is a perspective view of the adjustable tool support clamp of FIG. 1 with a claw grip in the parallel position and disposed beneath an automobile hood.

FIG. 5 is a perspective view of the adjustable tool support clamp of FIG. 5 with a claw grip in the perpendicular position.

FIGS. 8(a)-8(c) illustrate exemplar grips that can be used with the adjustable tool support clamp of the present application.

DETAILED DESCRIPTION OF THE PREFERRED EMBODIMENTS

Figure 3:
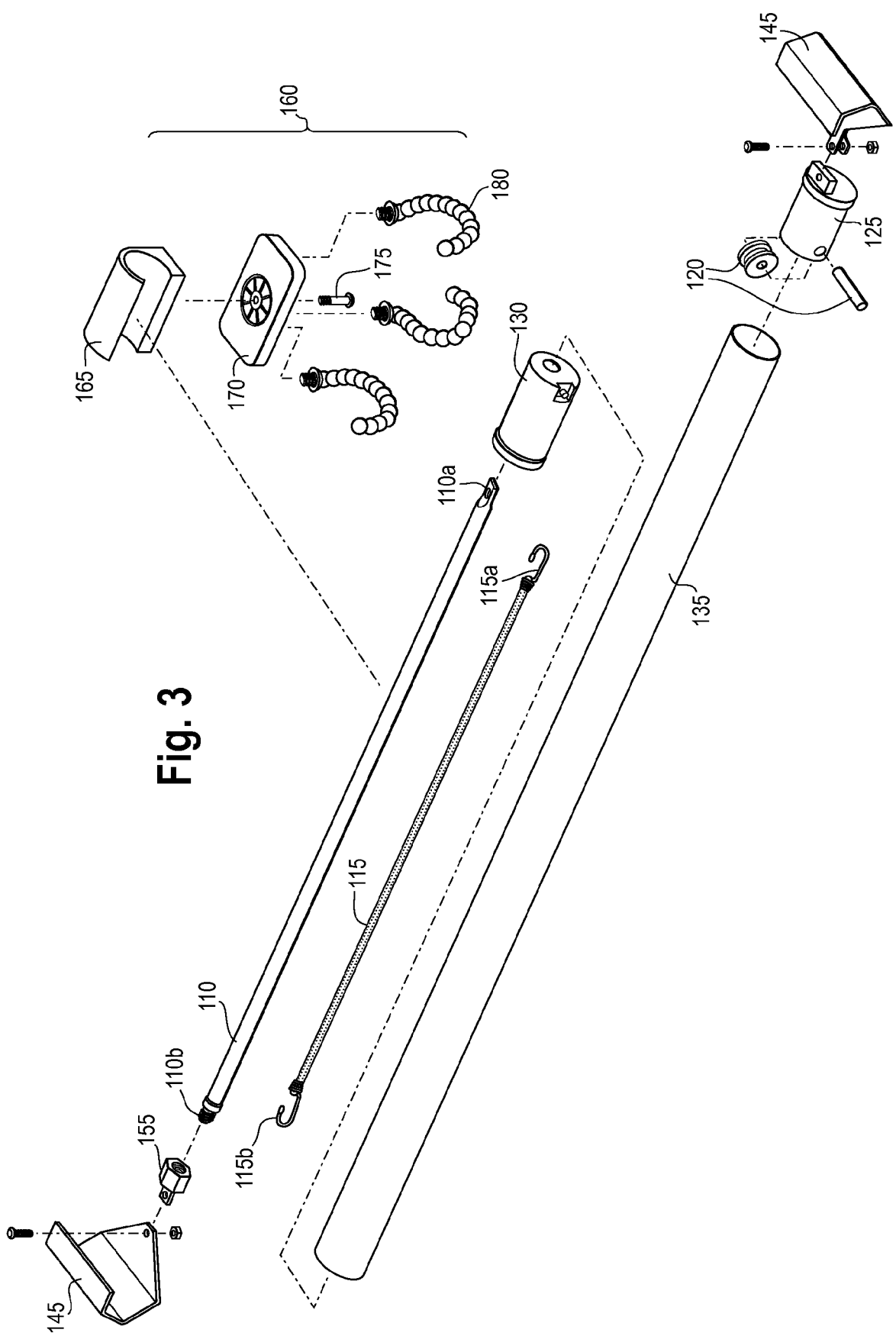
FIG. 3 is an exploded perspective view of the adjustable tool support clamp of FIG. 1.
Figure 7:
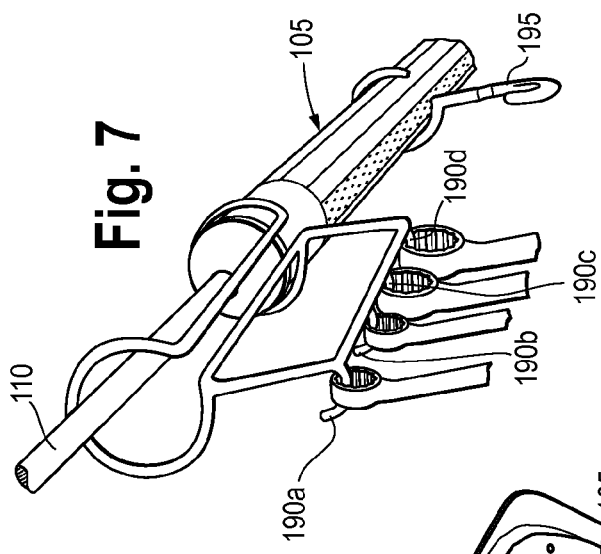
FIG. 7 is a perspective view of another embodiment of the adjustable tool support clamp with a tool holder and utility hook disposed on the body of the adjustable tool support clamp.
Figure 6:
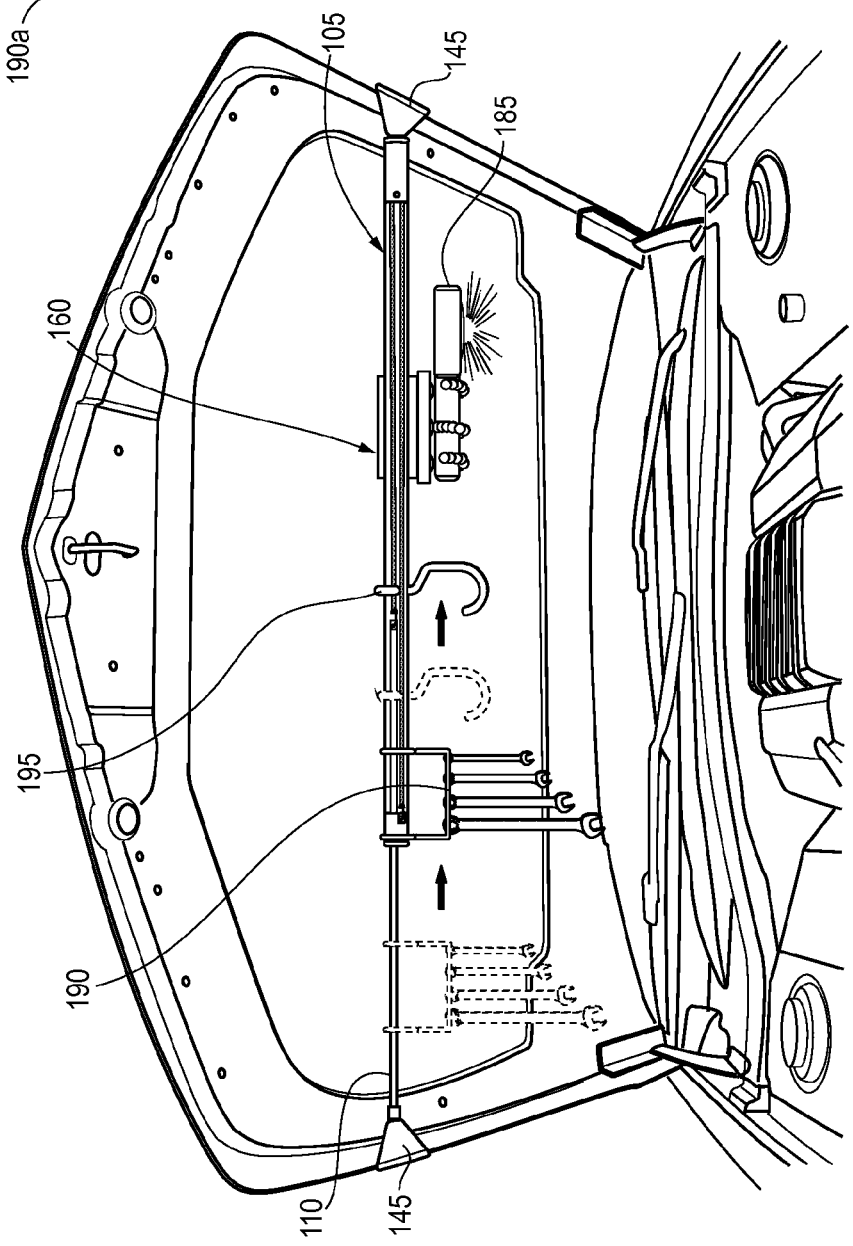
FIG. 6 is a plan view of another embodiment of the adjustable tool support clamp with various holding members adapted to hold objects such as tools or light fixtures, disposed beneath an automobile hood.

While the present invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The clamp structures disclosed herein provide versatility and structural adaptability to support clamps. The clamp can include a tension member that is coupled to an inside of a tubular body at a first end and to a rod at an opposing second end. In an embodiment, removable grips may be coupled to the ends of the tubular body but are preferably not directly coupled to the tension member so that replacing or changing the grips can be done without removing the tension member from its anchored position. The grips can, in some embodiments, be pivotable to accommodate a variety of different gripping surfaces. Various holding members such as a tool holder, a utility hook and/or a claw grip can be movably disposed on the tubular body and can hold tools or light fixtures in a variety of configurations.

Referring to FIG. 1, in an embodiment, the adjustable clamp 100 includes a body 105 having a rod 110 slidably disposed in a cavity of the body 105. The rod 110 has a first rod end 110a and a second rod end 110b, where the first rod end 110a is coupled to a tension member 115 that elastically biases the rod 110 toward a pulley 120 disposed inside the cavity of the body 105. In particular, the first rod end 110a is coupled to the tension member 115 at a first tension member end 115a, and a second tension member end 115b is coupled to the body 105.

In an embodiment, the body 105 can include three separate, structural backbone components: a first cap 125 and a second cap 130 that are each coupled to a main body member 135. At one end of the clamp 100, the first cap 125 includes a receiving member 140 adapted to receive one or more grips 145. On the other end of the clamp 100, the second cap 130 includes an opening 150 for the rod 110 to extend through and move within. The second end 110b of the rod can include a coupling member 155 adapted to couple to the grip 145 in a manner similar to the receiving member 140, and that is larger than opening 150 to prevent the rod 110 from retracting into the cavity of the body 105. As shown, a holding member 160, such as a claw grip, can be slidably disposed on the body 105.

The clamp 100 provides a retractive force on the grips 145 and allows replacement or changing of the grips 145 without requiring removal of the tension member 115 from the rod 110 and body 105. As shown in FIG. 1, the body 105 is a structural component that provides a physical backbone but does not itself provide a tensioning effect. The clamp 100 shown in FIG. 1 shows an embodiment of the present invention where a user can remove the grips 145 from their respective attachment points (i.e., the second rod end 110b for one grip 145 and the receiving member 140 for the other grip 145) without requiring the user to hold the tension member in place.

As shown, the body 105 is tubular, but it will be appreciated that the body 105 can be any shape without departing from the scope and spirit of the present invention. For example, the body 105 can be rectangular, triangular, or any other elongated shape.

The tension member 115 can be any member capable of providing an elastic bias or other force to the rod 110 to bias the rod 110 toward the pulley 120. For example, the tension member 115 can be a bungee cord, rubber band, chain, polymeric body, string, rope, or any other structure capable of imparting an elastic biasing force on the rod 110. As shown, the tension member 115 is received by the pulley 120 to apply the bias force in a compact and guided manner. However, the tension member 115 need not be received by or otherwise be coupled to a pulley 120, and can instead be coupled directly to the body 105 without departing from the scope and spirit of the present application.

As shown, the rod 110 slides substantially freely within opening 150 to allow the rod 110 to slidably move within the cavity of the body 105. However, the opening 150 can be any shape and can guide the rod 110 in any direction, including an annular configuration in which the rod 110 is curved or flexible and extends through a curved opening 150. Alternately, the rod 110 and opening 150 may include a structure that allows the rod 110 to be fixed in one or more predetermined positions relative to the body 105 via, for example, a detent mechanism or lock configuration. In this manner, the rod 110 can be positioned in a preferred setting and can be released to move the rod 110 under the bias force of the tension member 115 toward a first position, e.g., toward the pulley 120.

FIG. 3 illustrates an exploded view of an embodiment of the adjustable tool support clamp with like elements numbered the same as with FIGS. 1 and 2. As shown, the claw grip 160 includes a slide mount 165 adapted to move about the body 105 when coupled thereto, and a pivot body 170 coupled to the slide mount 165 by a bolt 175 or other well-known means. The claw grip 160 can also include several claw arms 180 coupled to the pivot body 170 and capable of gripping an object such as, for example, a fluorescent light.

The claw arms 180 can be flexible extremities of the claw grip 160 and can be covered by a soft material, such as a fabric or rubber, to protect the gripped object from damage. The internal structure of the claw arms 180 can be made of wire, plastic, metal, or any other flexible material capable of acting as an articulated finger of the claw grip 160. The claw arms 180 can thus grip objects such as a fluorescent light bulb and assist the user by directing light to the appropriate location or by gripping a tool and holding the tool in a preferred position.

FIGS. 4 and 5 illustrate an embodiment of the clamp 100 while coupled to a gripping surface, such as below an automobile hood. As shown, the clamp 100 includes claw grip 160 adapted to grip a light 185 to illuminate the working area, such as an engine bay. The claw grip 160 is capable of gripping any portion of the light 185, including the glass covering of a bulb, because of the soft and flexible claw arms 180. The claw grip 160 can thus direct the light 185 in virtually any direction and illuminate otherwise hard to see work spaces.

As discussed, the claw grip 160 can slidably move laterally along the body 105 of the clamp 100 because of the unique configuration of the slide mount 165. FIG. 5 illustrates yet another versatile capability of the claw grip 160—the ability to rotate the claw grip 160 about the pivot body 170 while holding the light 185 or other device to illuminate an area of the workspace that may be difficult to illuminate. Accordingly, the light 185 can illuminate virtually any portion of workspace, such as an engine bay, because of the versatile nature of the slide mount 165 and the pivot body 170.

As shown, the light 185 is an elongated tubular luminescent light bulb. However, any lighting device may be implemented with the clamp 100 without departing from the scope and spirit of the present application. Further, the claw grip 160 is shown in FIGS. 4 and 5 as rotated 90 degrees. However, one of ordinary skill would appreciate that the claw grip 160 can be rotated at any angle consistent with the present invention.

FIGS. 4 and 5 illustrate another embodiment of the present application with various holding members provided on the clamp 100. For example, the holding members can include a tool holder 190 and a utility hook 195, as well as the claw grip 160 discussed above. The holding members can slide along the body 105 and allow the user to position the holding members in a desired configuration so tools and lighting will be readily available for the user when needed.

In an embodiment, the tool holder 190 can include one or more hooks 190a-190d to hold tools, such as, for example, a wrench set. The tool holder 190 can be constructed of a wire configuration to bend around and conform to the shape of the body 105. The surface of the tool holder 190 can be smooth so as to reduce friction when sliding along the body 105. The tool holder 190 can include a covering material such as a rubber or cloth to reduce potential damage, such as rust or abrasions, that may occur when tools are placed on the tool holder 190.

The utility hook 195 can also be made of a wire configuration but is typically (although not necessarily) thicker and more structurally stable than the tool holder 190. In an embodiment, the utility hook 195 is intended to hold heavier objects such as, for example, car parts or tools heavier than those held by the tool holder 190. Similar to the tool holder 190, the utility hook can include a rubber or cloth cover to protect objects held thereon.

FIGS. 8(a)-8(c) illustrate exemplary gripping mechanisms 145 in accordance with the present application. As shown, the gripping mechanism 145 can include any structure or device adapted to grip an object, such as a flange on an automobile hood, and hold the clamp 100 steady relative to the object. The grips 145 can include a wire-based grip 805, a single angled bracket grip 810, or a multi-angled bracket grip 815, for example. It will be appreciated that any means of gripping a surface can be used for the grip 145 without departing from the scope and spirit of the present application.

In an embodiment, the grips 145 are removable from the body 105 of the clamp 100 and, as such, improve versatility of the clamp 100 by conforming to different gripping surfaces. For example, one gripping surface may be gripped better by a singled bracket grip 810, while another gripping surface may be better gripped by a wire-based grip 805. The user can thus change and adjust the clamp 100 to accommodate different gripping surfaces by the interchangeability of the grip 145.

The grips 145 can also be pivotable in any direction relative to the body 105 so as to accommodate different gripping surfaces. For example, the grips 145 can include a ball and socket structure that allows the grip to pivot about any axis and grip any angled surface due to the flexibility of the grip 145.

A method of using the clamp 100 will now be disclosed with reference to FIGS. 1-8. As shown in FIG. 2, the rod 110 can be pulled in a direction outwardly from the body 105 and subsequently biased toward the body 105 by tension member 115. However, when in the rest position (as shown in FIG. 1), the rod 110 may be biased toward the body 105 by the pulley 120 to allow the grips 145 to engage a gripping surface. When the user chooses to change the grips 145, the user does not need remove the tension member 115 from the second cap 130 or the rod 110 (i.e., the attachment points of the tension member 115). Rather, the user can disengage the grips 145 from the coupling member 155 and the receiving member 140 and replace the grip 145 with a more suitable grip 145 for the task at hand. The user is thus able to adapt the clamp 100 to a multitude of gripping surfaces without uncomfortably holding a tension member 115 against the bias of the tension member 115.

The manner set forth in the foregoing description and accompanying drawings and examples, is offered by way of illustration only and not as a limitation. More particular embodiments have been shown and described, and it will be apparent to those skilled in the art that changes and modifications may be made without departing from the broader aspects of Applicant's contribution. The actual scope of the protection sought is intended to be defined in the following claims when viewed in their proper prospective based on the prior art.

What is claimed is:

1. A tool clamp comprising:
a body having a cavity;
a tension member having first and second tension member ends, the first tension member end coupled to the body;
a rod slidably received in the body and having first and second rod ends, the first rod end adapted to removably receive a second grip, and the second rod end adapted to be coupled to the second tension member end and receive a bias force therefrom;
a receiving member coupled to the body and adapted to removably receive a second grip; and
a pulley coupled to the body and the tension member, the pulley adapted to guide the direction of the bias force applied by the tension member.

2. The tool clamp of claim 1, further comprising:
an aperture disposed on the body and adapted to axially receive the rod in the cavity; and
a coupling member adapted to removably couple to the first grip, wherein the coupling member is larger than the aperture to prevent the rod from fully entering the body when the first grip is removed.

3. The tool clamp of claim 1, wherein at least one of the first and second grips is selected from the group consisting essentially of a wire grip, a single-angle grip and a multi-angle grip.

4. The tool clamp of claim 1, wherein at least one of the first and second grips includes a ball and socket mechanism adapted to allow the at least one of the first and second grips to pivot.

5. The tool clamp of claim 1, further comprising a holding member adapted to slidably move along the body and further adapted to hold an object.

6. The tool clamp of claim 5, wherein the holding member is selected from the group consisting essentially of a claw grip, a tool holder, and a utility hook.

7. A tool clamp comprising:
a body having a cavity and first and second body ends;
a rod extending axially within the cavity and having first and second rod ends;
a first grip coupled to the first body end;
a tension member having first and second tension member ends, the first tension member end coupled to the first rod end and the second tension member end coupled to the body;
a second grip coupled to the second rod end; and
a claw grip movably disposed on the body and including claw arms adapted to cooperatively grip an object, wherein the claw grip is adapted to move along the body and rotate about a plane parallel to the body.

8. The tool clamp of claim 7, further comprising an aperture disposed on the body and adapted to receive the rod axially within the cavity; and a coupling member adapted to removably couple to the first grip, wherein the coupling member is larger than the aperture to prevent the rod from fully entering the body when the first grip is removed.

9. The tool clamp of claim 7, further comprising a pulley coupled to the body and the tension member, the pulley adapted to guide a biasing force applied by the tension member.

10. The tool clamp of claim 7, wherein at least one of the first and second grips is selected from the group consisting essentially of a wire grip, a single-angle grip and a multi-angle grip.

11. The tool clamp of claim 7, wherein at least one of the first and second grips includes a ball and socket mechanism allowing the at least one of the first and second grips to pivot.

12. The tool clamp of claim 7, further comprising a tool holder adapted to hold a plurality of tools, and further adapted to move along the body.

13. The tool clamp of claim 7, further comprising a utility hook adapted to move along the body.

14. A tool clamp comprising:
a body having a cavity and first and second body ends;
a first grip coupled directly to the first body end;
a tension member having first and second tension member ends, the first tension member end coupled to the body;
a rod axially received in the body and having first and second rod ends, the first rod end adapted to removably receive a second grip, and the second rod end adapted to be coupled to the second tension member end and receive a bias force therefrom; and
a receiving member coupled to the body and adapted to removably receive a second grip.

15. The tool clamp of claim 14, further comprising:
an aperture disposed on the body and adapted to axially receive the rod in the cavity; and
a coupling member adapted to removably couple to the first grip, wherein the coupling member is larger than the aperture to prevent the rod from fully entering the body when the first grip is removed.

16. The tool clamp of claim 14, further comprising a pulley coupled to the body and the tension member, the pulley adapted to guide the bias force from the tension member.

17. The tool clamp of claim 14, wherein at least one of the first and second grips is selected from the group consisting essentially of a wire grip, a single-angle grip and a multi-angle grip.

18. The tool clamp of claim 14, wherein at least one of the first and second grips includes a ball and socket mechanism adapted to allow the at least one of the first and second grips to pivot.

19. The tool clamp of claim 14, further comprising a holding member adapted to slidably move along the body and further adapted to hold an object.

20. The tool clamp of claim 19, wherein the holding member is selected from the group consisting essentially of a claw grip, a tool holder, and a utility hook.

* * * * *